July 4, 1939. E. C. HORTON Re. 21,139

MOTOR VEHICLE SYSTEM

Original Filed Aug. 16, 1935 2 Sheets-Sheet 1

INVENTOR
Erwin C. Horton,
BY
Bean, Brooks, Buckler & Bean,
ATTORNEYS

July 4, 1939. E. C. HORTON Re. 21,139
MOTOR VEHICLE SYSTEM
Original Filed Aug. 16, 1935 2 Sheets-Sheet 2
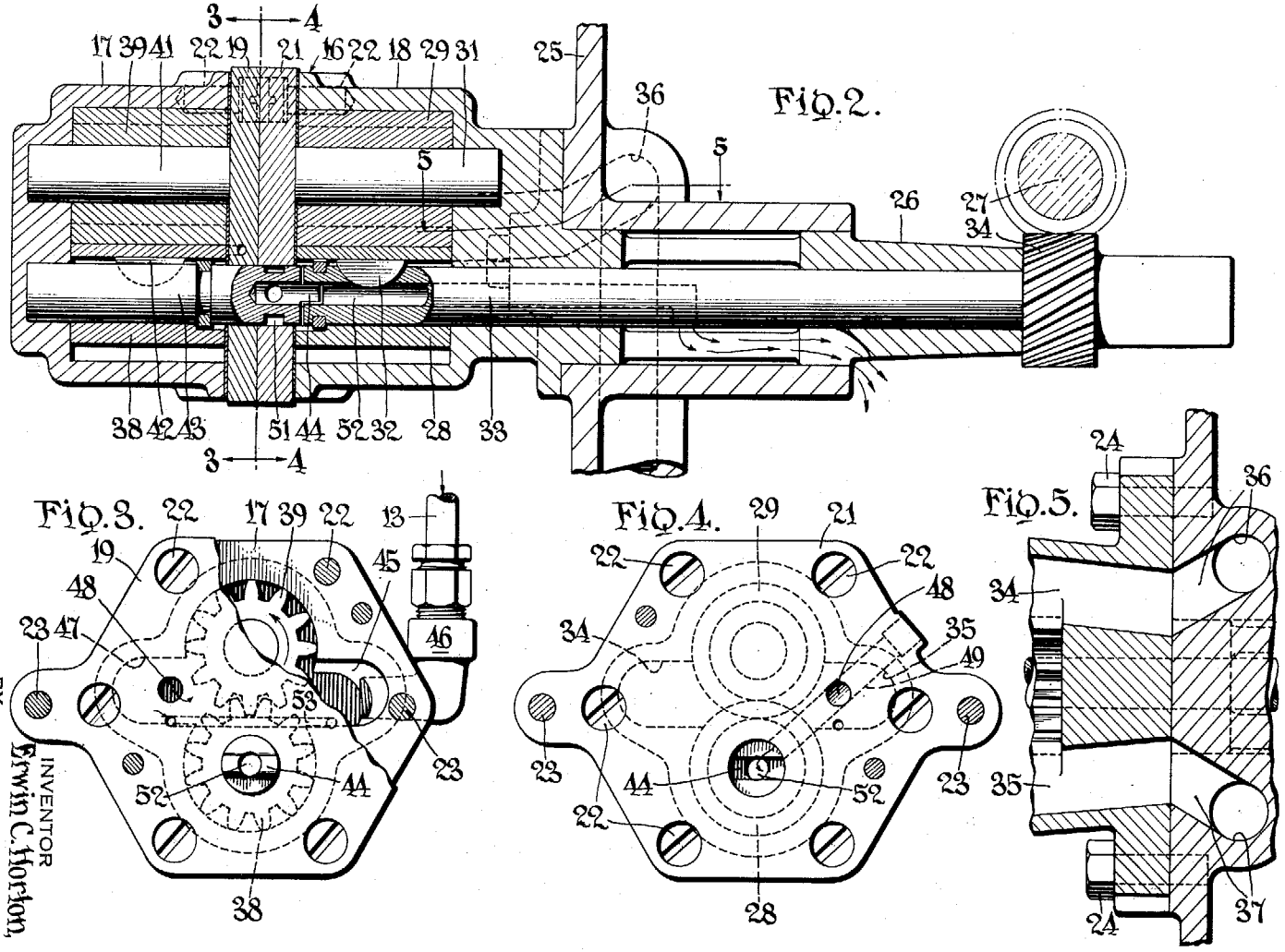
INVENTOR
Erwin C. Horton,
BY
Beau, Brooks, Buckley & Beau.
ATTORNEYS Reissued July 4, 1939

Re. 21,139

UNITED STATES PATENT OFFICE 21,139

MOTOR VEHICLE SYSTEM

Erwin C. Horton, Hamburg, N. Y., assignor to Trico Products Corporation, Buffalo, N. Y.

Original No. 2,088,908, dated August 3, 1937, Serial No. 36,599, August 16, 1935. Application for reissue September 30, 1938, Serial No. 232,618

10 Claims. (Cl. 230—38)

This invention relates to suction systems, as for example, the systems for operating the vacuum windshield cleaners and horns of motor vehicles, and relates particularly to the suction pumps for such systems, its object being to render practical such suction actuated accessory system by reason of an efficient suction generator therefor. The invention comprehends the association of the lubricating system of a motor vehicle engine with a pump to condition the latter for efficient withdrawal of air from the suction system, and for discharging the exhausted air independently from the lubricant distributing system of the engine.

These and other objects and advantages will become apparent from the following description of one typical embodiment of the invention, made in connection with the accompanying drawings, wherein:

Fig. 2 is a longitudinal vertical section through the pump mechanism, and showing a portion of the engine crank case upon which the pump is mounted;

Fig. 3 is a view taken principally along the section line of Fig. 2 in the direction of arrows 3—3, but being partially broken away to reveal interior mechanism;

Fig. 4 is also a view taken along the section line of Fig. 2 in the direction of arrows 4—4;

Fig. 5 is a fragmentary sectional view taken in the plane of line 5—5 of Fig. 2;

Figure 1:
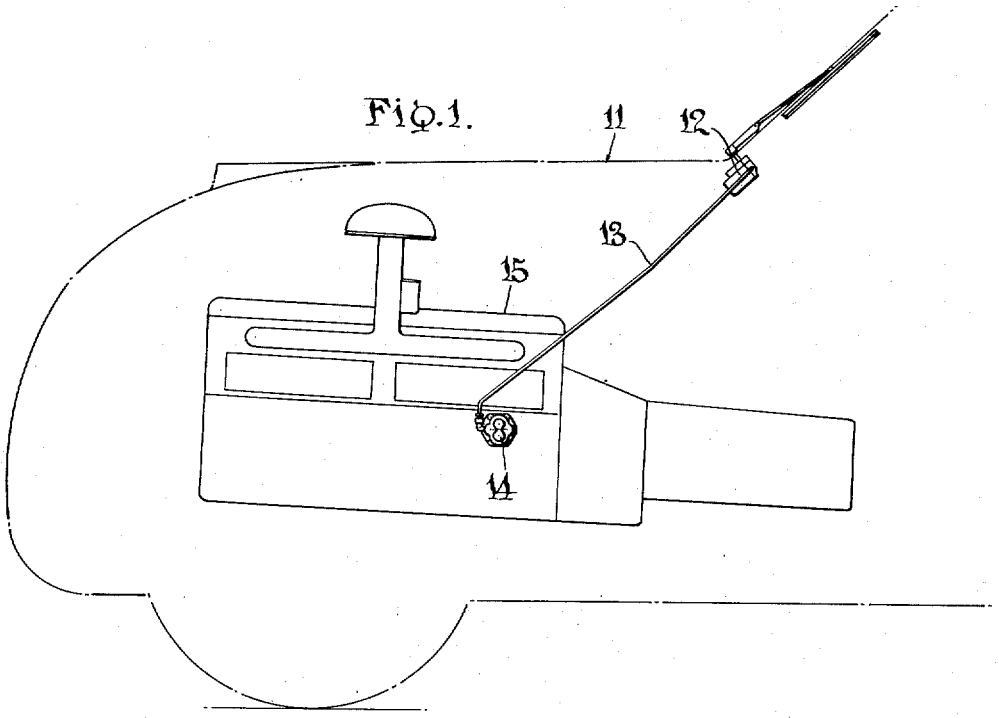
Fig. 1 is a view of a portion of a motor vehicle, showing one form of the invention, associated with the engine and a suction accessory of the vehicle.
Figure 6:
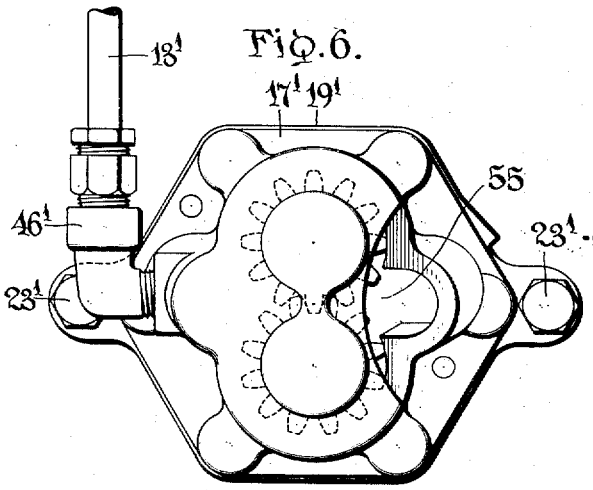
Fig. 6 is a bottom plan view of another form of the pump device.
Figure 7:
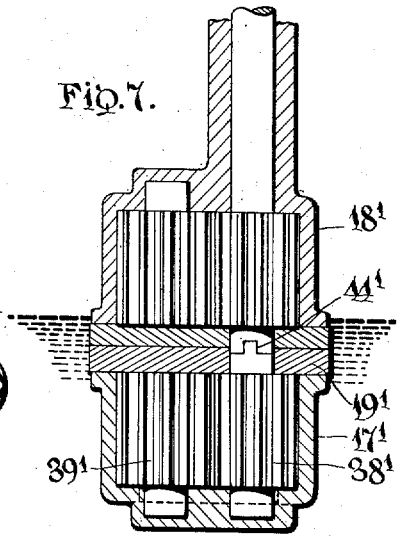
Fig. 7 is a vertical sectional view through another embodiment of the invention.

As shown in Fig. 1, the suction system of the motor vehicle 11 may include a suction operated accessory, such as windshield cleaner 12 and a suction conduit 13 extending from the accessory to the suction pump 14 mounted upon and driven by the vehicle's internal combustion engine 15. The pump may be mounted exteriorly of the crank case chamber, as depicted in Figs. 6 and 7, or it may be arranged exteriorly thereof, as illustrated in Figs. 2, 3, 4 and 5. The pump may be associated directly with the oil pump of the force feed lubricating system to be driven therefrom, or it may be disposed separate therefrom for independent drive and operation.

When the pump 14 is combined with the oil pump, it may comprise casing sections 17 and 18 separated by plates 19 and 21. Screws 22 connect the casing sections to the plates, and the latter are secured together by fasteners 23. The innermost casing section 18 is flanged for connection by fasteners 24 to a mounting bracket, such as the engine crank case 25, and has a bearing portion 26 extended into the crank case into adjacency with a rotating shaft of the engine, such as cam shaft 27. Within casing section 18 are a pair of meshing gears 28 and 29 which constitute pump elements for the engine lubricating oil, the driven gear 29 being mounted for rotation on stub shaft 31, and the driving gear 28 being keyed, by means 32, to the pump drive shaft 33. The latter is journalled in the casing 18, including bearing portion 26, and carries a pinion 34 meshing with a gear element upon the cam shaft 27.

During normal operation of the engine, gears 28 and 29 rotate in a counter-clockwise and clockwise direction, respectively (as viewed in Fig. 4), so that oil is carried from the inlet chamber 34 of the pump to the outlet chamber 35. Chamber 34 may communicate with a duct 36, in the crank case, which may lead to a sump or other source of supply of engine oil, and chamber 35 may communicate with a duct 37 in the crank case leading to various bearings and other parts of the engine to be lubricated.

The suction generating portion of the pump comprises meshing gears 38, 39 in the casing section 17, the gear 39 being mounted on stub shaft 41 and gear 38 being keyed by key 42 to shaft 43. The latter is aligned with shaft 33 and keyed for rotation therewith by a tongue and groove connection 44. Conduit 13 opens into the suction chamber 45 of the suction pump through fitting 46. The discharge, from the pressure or outlet chamber 47 of the suction pump, is through registering openings, 48, 48 in plates 19 and 21, and connecting passage 49, in plate 21, into an annular groove 51 in shaft 43, and thence through a bore 52 in shafts 43, 33 and through an opening in bearing portion 26 into the crankcase interior.

Operation of the gear-type pump for inducing suction of high degree, for satisfactory operation of suction accessories, is enabled by discharge of a portion of the output from oil pump chamber 35 into the suction chamber 45 of the suction pump. This is accomplished by a duct 53 of restricted area which extends through plates 21 and 19 from chamber 35 to chamber 45.

In operation of the pump apparatus it will be understood that gears 28, 29 will cooperate, upon rotation in the direction of the arrows in Fig. 4, to intake engine lubricating oil from duct 36 and discharge it under pressure into the engine oil distributing system through duct 37. However, a small portion of the oil from discharge chamber 35 is passed, via duct 53, into the suction side of the suction inducing gears 38, 39. Such oil becomes distributed over the surfaces of gears 38, 39 thereby forming a sealing film between the meshing gears and between the surfaces of the gears and the adjacent walls of casing 17 and plate 19. Oil accumulating in discharge chamber 47 will be returned, along with the air discharge, to the engine crank case or oil sump. The suction maintaining in chamber 45 will aid in the flow of oil from chamber 35 through duct 53, or in the event of a condition of extremely low or no pressure in chamber 35, will in and of itself maintain the flow. In either event, the casing 18, and the oil passages therethrough, constitute a passage for oil from the engine crankcase into duct 53.

In motor vehicles wherein the oil pump is mounted within the crankcase, rather than exteriorly thereof, it is disposed substantially in an upright position with its inlet port submerged in the bath of oil therein contained. This arrangement is illustrated in Fig. 7 wherein the oil pump casing 18' has its lower portion dipping below the oil level. The suction pump casing 17' may be separated from the oil pump by plate 19' and attached to the oil pump by the bolts 23', the key 44' providing the preferred driving connection therewith. The delivery side of the suction pump is freely open to the oil so that the meshing gears 38' and 39' operate in the bath. The pump casing 17' may be cut away at its delivery side as at 55 (Fig. 6), so as to expose the gears to the bath beneath the oil level thereof. During the periods of rest the oil will flood the gears, while during pump operation the gears will work in the oil to maintain the desired liquid seal between each other for withdrawing air from the accessory through the conduit 13' and fitting 46'.

In both forms of the invention the suction pump is liquid sealed for greater air displacement, the sealing oil being delivered to the suction pump in one instance by a branch conduit from the delivery side of the oil pump and in the other instance by the reservoir at the intake side of the oil pump. In both instances the oil is delivered to the suction pump in a manner to maintain a proper liquid seal but without materially impairing the air displacing capacity of the pump or its efficiency as a suction generator. In the submerged embodiment, the suction pump has its intake side closed from the bath so that the complete air displacement is effected in a manner similar to the embodiment illustrated in Figs. 2 and 3.

It will be understood that by the means hereinbefore described, power taken from the cam shaft or other rotating part associated with the motor vehicle engine is utilized to produce suction for operating an accessory or accessories; that the air withdrawn from the suction system, together with engine oil used in the suction producing means for sealing and lubricating purposes is returned to the engine crankcase but is not admixed with oil under pressure which is pumped into the distributing system for lubricating the engine.

It will be understood further that the apparatus and system described and shown herein is merely illustrative of the inventive principles involved, which may be applied to other physical embodiments without departing from the scope and spirit of the invention claimed.

I claim:

1. Means associated with a vehicle engine and the lubricating system thereof for producing suction, said engine having a pump shaft, comprising a driving pump gear on said shaft casing means enclosing said gear a driven pump gear meshing with said driving gear in said casing and inlet and outlet passages from said pump casing on opposite sides of said gears for respectively receiving oil from the engine crankcase and discharging it into the distributing system for lubricating the engine, a second driving gear driven by said shaft, a second driven gear meshing with said second driving gear casing means enclosing said second gears and providing an inlet and an outlet chamber on opposite sides of the second gears, means for connecting the inlet chamber to a suction line and a fluid passage for conducting fluid from the outlet chamber to the engine crank case, and a fluid passage extending between said outlet passage and said inlet chamber for conducting a limited quantity of oil for lubricating and sealing said second gears for pumping action.

2. Means associated with a vehicle engine and the lubricating system thereof for producing suction, the engine having a driving part and an oil pump operated by said driving part for pumping oil from a reservoir in the engine to passages in the distributing system for lubricating the engine, comprising a casing having therein a pair of pumping gears and inlet and outlet chambers on opposite sides of the gears, means connecting said gears for rotation by the engine, means for connecting the inlet chamber to a suction line, means for connecting the outlet chamber to the reservoir in the engine, and a passage between the outlet of the oil pump and said inlet chamber whereby a portion of the oil pumped by said oil pump may be diverted to the casing for lubricating and sealing said gears for pumping action.

3. The combination with the force-feed lubricating system of a motor vehicle power plant including a lubricant reservoir and pump and distributing passages, of a gear type air suction pump having an air inlet and air outlet, the outlet discharging into the lubricant reservoir, means for connecting the air inlet to a suction line and means for conducting a sealing quantity of lubricant from the lubricant pump to the suction pump, whereby lubricant is diverted from the lubricating system for sealing the gear elements of the suction pump against air leakage and is returned to the lubricant reservoir independently of the lubricant distributing passages.

4. The combination with a motor vehicle power plant having an oil reservoir and an oil pump having a drive shaft and having its inlet connection below the oil level of said reservoir, of a gear type suction pump having an opening in communication with an outlet from the oil pump for receiving a quantity of oil therefrom for sealing the pumping gears of the suction pump, said suction pump having means connecting one gear element thereof to said drive shaft for operation thereby, and having its outlet opening into said reservoir, and means for connecting the inlet of the suction pump to a suction line.

5. The combination with a motor vehicle power plant having an oil reservoir and a lubricant distributing system, of a casing secured to the power plant and having a partition forming in the casing an oil pump compartment and a suction pump compartment, drive shaft means extending through said chambers and having an operable connection to a moving part of the engine, pump elements operable by said shaft means in said compartments between the fluid inlet and outlet chambers thereof, said casing having an inlet passage for conducting oil from the reservoir to the inlet chamber of the oil pump compartment and an outlet passage for conducting oil from the outlet chamber of the oil pump compartment to the power plant lubricant distributing system, and a passage between the outlet chamber of the oil pump compartment and the inlet chamber of the suction pump compartment for conducting a sealing quantity of lubricant into the latter, and a passage for conducting fluid from the outlet chamber of the suction pump compartment to said reservoir independently of the outlet and inlet passages of the oil pump compartment.

6. The combination with a motor vehicle power plant having an oil reservoir and distributing system, of an oil pump mounted upon said power plant and having oil inlet and outlet passages respectively connected to said reservoir and distributing system, said oil pump having a power plant driven operating shaft extending therethrough, said shaft having a passage therethrough communicating with said oil reservoir, and a suction pump adjacent said oil pump, and having a fluid inlet and means for connecting it to a suction line, said suction pump having means for connecting the pumping means thereof to said shaft for operation thereby and having its fluid outlet in communication with the passage through said shaft.

7. Means for association with a vehicle engine and the lubricating system thereof for producing suction, the engine having a driving part and an oil pump operated by said driving part for pumping oil from a reservoir in the engine to passages in the distributing system for lubricating the engine, comprising a casing, fluid displacing means therein including a pair of meshing rotatable pumping members and inlet and outlet chambers on opposite sides of the members, means connecting said members for movement by the engine, said members having sliding contact with the casing wall, means for connecting the inlet chamber to a suction line, means for connecting the outlet chamber to the reservoir in the engine, and a passage between the outlet of the oil pump and said inlet chamber whereby a portion of the oil pumped by said oil pump may be diverted to the casing for lubricating and sealing said members for pumping action.

8. The combination with the force-feed lubricating system of a motor vehicle power plant including a lubricant reservoir and pump and distributing passages, of an air suction pump having a chamber and a pumping element angularly movable therein and having wall portions slidably engaging the walls of said chamber, said pump having an air inlet and an air outlet with the outlet discharging into the lubricant reservoir, and means for conducting a sealing quantity of lubricant from the lubricant pump to the suction pump, whereby lubricant is diverted from the lubricating system for sealing the pumping element of the suction pump against air leakage and is returned to the lubricant reservoir independently of the lubricant distributing passages.

9. The combination with a motor vehicle power plant having an oil reservoir and a lubricant distributing system, of an oil pump compartment and a suction pump compartment, drive shaft means having an operable connection to the engine, pump elements in said compartments driven angularly in sliding contact with the walls of said compartment by said shaft means to force fluid from the inlets to the outlets thereof, the pump elements being operably connected to the drive shaft means to effect such driving action, an inlet passage for conducting oil from the reservoir to the inlet of the oil pump compartment and an outlet passage for conducting oil from the outlet of the oil pump compartment to the power plant lubricant distributing system, and a passage between the outlet of the oil pump compartment and the inlet of the suction pump compartment for conducting a sealing quantity of lubricant into the latter, and a passage for conducting fluid from the outlet of the suction pump compartment to said reservoir independently of the outlet and inlet passages of the oil pump compartment.

10. The combination with a motor vehicle power plant having an oil reservoir and an oil pump having a drive shaft and having its inlet connection below the oil level of said reservoir, of a suction pump secured to said oil pump and having an inlet passage in communication with an outlet from the oil pump for receiving a sealing quantity of oil from the oil pump, said suction pump having means connecting a pumping element thereof to said drive shaft for operation thereby, and having its inlet connectable to a suction line and its outlet opening into said reservoir.

ERWIN C. HORTON.